(12) United States Patent
Kato et al.

(10) Patent No.: US 10,523,365 B2
(45) Date of Patent: Dec. 31, 2019

(54) DISCRIMINATION METHOD AND COMMUNICATION SYSTEM

(71) Applicant: FUJITSU LIMITED, Kawasaki-shi, Kanagawa (JP)

(72) Inventors: Keizo Kato, Kawasaki (JP); Kensuke Kuraki, Ichikawa (JP); Ryuta Tanaka, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/041,038

(22) Filed: Jul. 20, 2018

(65) Prior Publication Data
US 2019/0036646 A1    Jan. 31, 2019

(30) Foreign Application Priority Data
Jul. 25, 2017    (JP) .................................. 2017-143710

(51) Int. Cl.
*H04L 1/00* (2006.01)
*H04B 10/116* (2013.01)

(52) U.S. Cl.
CPC .......... *H04L 1/0048* (2013.01); *H04B 10/116* (2013.01); *H04L 1/0061* (2013.01)

(58) Field of Classification Search
CPC ..... H04B 10/11; H04B 10/116; H04L 1/0048; H04L 1/0061
See application file for complete search history.

(56) References Cited

U.S. PATENT DOCUMENTS

| 9,871,587 B2* | 1/2018 | Aoyama ............... H04B 10/116 |
| 2002/0196415 A1* | 12/2002 | Shiratani ................ G01B 11/25 353/31 |
| 2008/0030711 A1* | 2/2008 | Iizuka ........................ G01S 1/70 356/4.03 |
| 2009/0010537 A1* | 1/2009 | Horie ........................ G09G 5/02 382/167 |
| 2010/0188588 A1* | 7/2010 | Sato ...................... H04N 9/3111 348/744 |
| 2013/0163994 A1* | 6/2013 | Iizuka .................. H04B 10/116 398/130 |

(Continued)

FOREIGN PATENT DOCUMENTS

| JP | 2012-055582 | 3/2012 |
| JP | 2014-096157 | 5/2014 |

(Continued)

OTHER PUBLICATIONS

EESR—Extended European Search Report dated Dec. 13, 2018 for corresponding European Patent Application No. 18184152.9.

(Continued)

*Primary Examiner* — Mina M Shalaby
(74) *Attorney, Agent, or Firm* — Fujitsu Patent Center

(57) ABSTRACT

The procedure includes generating an image to represent a photographing range including at least a part of a range irradiated by light emitted from a light source, information to be transmitted being superimposed on the light, specifying a region where the information is decoded, on the image, and discriminating which of the light source and an object reflecting the light is photographed in the region, based on a similarity between a color of the region and a color of the light emitted from the light source.

11 Claims, 11 Drawing Sheets

(56) References Cited

U.S. PATENT DOCUMENTS

| | | | | |
|---|---|---|---|---|
| 2016/0080079 A1* | 3/2016 | Kuraki | ................ | H04B 10/116 |
| | | | | 398/25 |
| 2016/0112125 A1* | 4/2016 | Yokoi | ................ | H04B 10/116 |
| | | | | 398/118 |
| 2016/0350890 A1* | 12/2016 | Kato | ................ | H04N 1/32203 |
| 2017/0099104 A1* | 4/2017 | Kuraki | ................ | H04B 10/116 |
| 2017/0195047 A1* | 7/2017 | Kato | ................ | H04B 10/116 |
| 2017/0205291 A1* | 7/2017 | Shimada | ................ | G01J 9/00 |
| 2017/0206417 A1* | 7/2017 | Aoyama | ............ | G06K 9/00671 |
| 2017/0264364 A1* | 9/2017 | Aoyama | ................ | G08C 23/04 |
| 2018/0102846 A1* | 4/2018 | Aoyama | ............. | H04B 10/116 |
| 2018/0114566 A1* | 4/2018 | Aoyama | ............... | G06F 3/011 |
| 2018/0212684 A1* | 7/2018 | Aoyama | ............... | G06F 1/1626 |

FOREIGN PATENT DOCUMENTS

| | | |
|---|---|---|
| JP | 2015-018013 | 1/2015 |
| WO | 2013/054221 A1 | 4/2013 |
| WO | 2016/060518 A1 | 4/2016 |

OTHER PUBLICATIONS

Mizuguchi et al., "An Indoor Positioning Method using Visible Light Communication and a High-definition Fish-eye Camera", The Institute of Electronics, Information, and Communication Engineers general conference, communication conference paper collection 2, 2010, p. 633 (6 pages).

* cited by examiner

SYMBOL VALUE '0'

SYMBOL VALUE '1'

DISCRIMINATION METHOD AND COMMUNICATION SYSTEM

CROSS-REFERENCE TO RELATED APPLICATION

This application is based upon and claims the benefit of priority of the prior Japanese Patent Application No. 2017-143710, filed on Jul. 25, 2017, the entire contents of which are incorporated herein by reference.

FIELD

The embodiments discussed herein are related to a discrimination method for discriminating a region where a light source is represented on an image, and a communication system using the discrimination method.

BACKGROUND

A light emitting diode (LED) is widely used as an illumination light source. The LED has the characteristic of a fast response speed, as compared to, for example, an incandescent lamp or a fluorescent lamp. With this characteristic, a visible light communication technology has been studied which performs a communication by making the LED flicker at a speed that cannot be recognized by the human eyes and superimposing information on the light emitted from the LED. Especially, the technique of superimposing information to be transmitted on the illumination light is also called an illumination light communication.

It has been considered that the visible light communication is used for a communication in a place where the use of radio waves is restricted, an information distribution limited to the range which light reaches such as indoors, or the intelligent transport system (ITS).

In the visible light communication, a technique has been suggested in which an apparatus receiving information superimposed on light from an illumination light source receives light reflected by an object from the illumination light source, and demodulates the information superimposed on the light.

Related technologies are disclosed in, for example, Japanese Laid-Open Patent Publication No. 2012-055582.

SUMMARY

According to an aspect of the invention, a computer-readable non-transitory recording medium storing program that causes a computer to execute a procedure, the procedure includes obtaining an image to represent a photographing range including at least a part of a range irradiated by light emitted from a light source, information to be transmitted being superimposed on the light, specifying a region where the information is decoded, on the image, and discriminating which of the light source and an object reflecting the light is photographed in the region, based on a similarity between a color of the region and a color of the light emitted from the light source.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In an image generated by an image capturing unit included in a reception apparatus that receives information superimposed on light from an illumination light source, both the illumination light source itself and an object reflecting the light emitted from the illumination light source may be photographed. In this case, the reception apparatus may decode superimposed information from each of the region where the illumination light source itself is photographed and the region where the object reflecting the light emitted from the illumination light source is photographed. Thus, according to occasions, the reception apparatus may not determine whether the decoded information is used for the region where the illumination light source itself is photographed or the region where the object reflecting the light emitted from the illumination light source is photographed.

Hereinafter, descriptions will be made on an embodiment of the technology capable of discriminating whether or not a region where light superimposed with information thereon is represented on an image corresponds to light received directly from a light source, with reference to the accompanying drawings. In a communication system to which this technology is applied, a transmission apparatus superimposes information on light emitted from an illumination light source. A reception apparatus which is an example of a discrimination apparatus used in the communication system has an image capturing unit. The reception apparatus photographs at least one of the illumination light source and the object reflecting the light emitted from the illumination light source with the image capturing unit per specific period, so as to generate an image where at least one of the illumination light source and the object reflecting the light emitted from the illumination light source is photographed, per specific period. Then, the reception apparatus decodes the information superimposed on the light emitted from the illumination light source, based on the image generated per specific period. At this time, as to a region where the information has been decoded on the image, the reception apparatus discriminates which of the illumination light source itself and the object reflecting the light emitted from the illumination light source is photographed, based on the similarity between the color of the region and the color of the light emitted from the illumination light source.

Hereinafter, the object reflecting the light emitted from the illumination light source will be simply referred to as a reflecting object.

Figure 1:
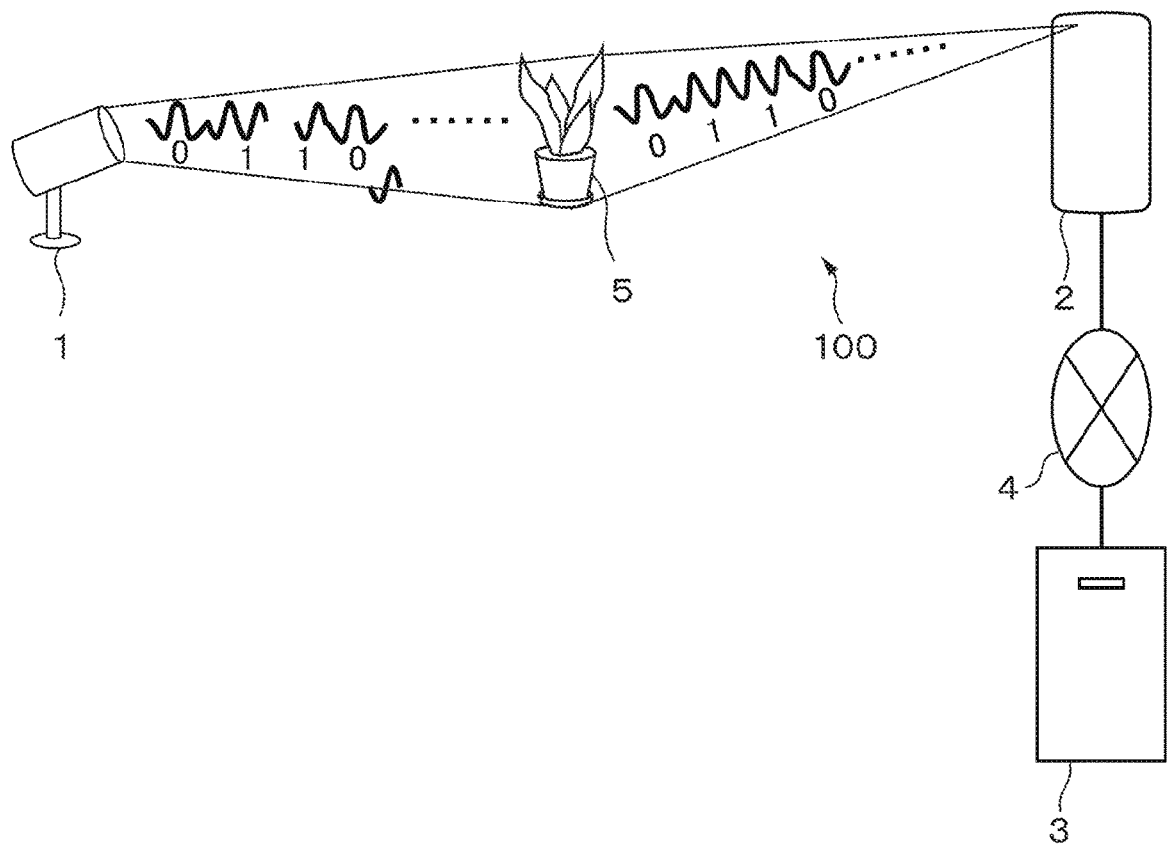
FIG. 1 is a schematic configuration diagram of a communication system according to an embodiment.

FIG. 1 is a schematic configuration diagram of a communication system according to an embodiment. A communication system 100 includes a transmission apparatus 1, a reception apparatus 2, and a server 3. The transmission apparatus 1 superimposes information to be transmitted on light emitted by an illumination light source of the own apparatus. The information to be superimposed may be, for example, identification information for identifying a reflecting object 5 illuminated by the illumination light source of the transmission apparatus 1, but is not limited thereto. Meanwhile, the reception apparatus 2 includes an image capturing unit, and decodes the information superimposed on the light from a plurality of consecutive images in time which are obtained in the image capturing unit by sequentially and continuously photographing a photographing range including the transmission apparatus 1 itself or the reflecting object 5 illuminated by the light from the transmission apparatus 1. Further, the reception apparatus 2 is capable of communicating with the server 3 via a communication network 4, and transmits the decoded information to the server 3. Then, upon receiving the decoded information from the reception apparatus 2, the server 3 sends other information corresponding to the received information in response, to the reception apparatus 2. The other information may be, for example, related information of the reflecting object 5. Further, the reception apparatus 2 discriminates whether the illumination light source of the transmission apparatus 1 or the reflecting object 5 is photographed, with respect to the region where the information has been decoded on the image. Then, the reception apparatus 2 generates a composite image in which the other information received from the server 3 is represented in the region where the reflecting object 5 is photographed on the image or near the region, and causes a display device of the reception apparatus 2 to display the composite image.

In addition, in the present example, the communication system 100 includes only one reception apparatus 2. However, the number of reception apparatuses 2 included in the communication system 100 is not limited to one. The communication system 100 may include a plurality of reception apparatuses 2. Similarly, the communication system 100 may include a plurality of transmission apparatuses 1.

Figure 2:
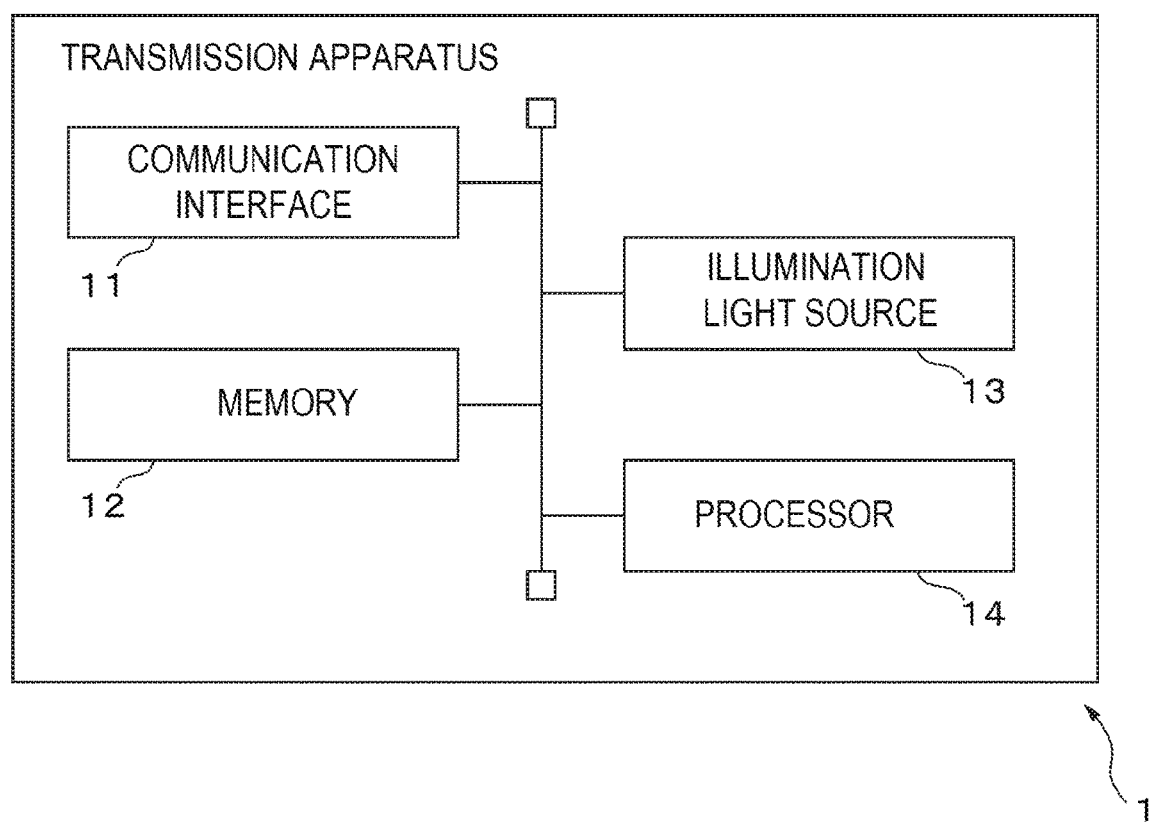
FIG. 2 is a hardware configuration diagram of a transmission apparatus used in the communication system illustrated in FIG. 1.

FIG. 2 is a hardware configuration diagram of the transmission apparatus 1. The transmission apparatus 1 includes a communication interface 11, a memory 12, an illumination light source 13, and a processor 14. The transmission apparatus 1 superimposes the identification information of the reflecting object 5 acquired via the communication interface 11 or stored in advance in the memory 12, on the light emitted by the illumination light source 13 and transmits the information.

The communication interface 11 includes, for example, a communication interface for connecting the transmission apparatus 1 to another apparatus, and a control circuit thereof. The communication interface 11 transfers information received from another apparatus to the processor 14. The information received from another apparatus may be, for example, the identification information of the reflective object 5.

The memory 12 includes, for example, a non-volatile semiconductor memory dedicated for reading and a writable and readable volatile semiconductor memory. The memory 12 stores, for example, the identification information of the reflective object 5. Further, the memory 12 stores various kinds of information and programs to be used by the processor 14 for performing a transmission process. For example, the memory 12 stores waveform data representing a light emission pattern corresponding to a symbol value, for each symbol value. The waveform data representing the light emission pattern includes, for example, a phase and a period of the light emission pattern at the starting time of the control of the light from the illumination light source 13, maximum and minimum values of the feature of the modulated light according to the light emission pattern. Alternatively, the memory 12 may pre-store the waveform data representing the light emission pattern of each symbol included in the identification information of the reflecting object 5.

The illumination light source 13 is an example of a light source, and includes at least one light emitting element capable of changing the feature of the emitted light in time series, and a driving circuit. The driving circuit drives the at least one light emitting element so as to change the feature of the light emitted from the at least one light emitting element according to a control signal from the processor 14. For example, the driving circuit regulates a magnitude of a current flowing through the light emitting element or a duty ratio of a time period when the current flows through the light emitting element, according to the luminance of the light emitted from the light emitting element or the intensity of the color components of the light which is instructed by the control signal.

The feature of the light which is changeable in time series may be, for example, the luminance. Alternatively, the feature of the light which is changeable in time series may be luminescent color. In addition, the feature of the light which is changeable in time series may be a combination of the luminescent color and the luminance.

When the feature of the light which is changeable in time series is the luminance, the illumination light source 13 may include at least one light emitting element capable of changing the luminance in time series, for example, a white LED or an organic electroluminescence (EL) element.

In addition, when the feature of the light which is changeable in time series is a feature related to the color, the illumination light source 13 includes at least two kinds of light emitting elements which are different in luminescent color from each other, for example, at least two of a red LED, a green LED, and a blue LED. When the ratio of the intensity of the color emitted by each light emitting element changes in time series, the color of the light emitted by the illumination light source 13 also changes in time series. Alternatively, the illumination light source 13 may include at least one light emitting element capable of modulating the luminescent color itself. The light emitting element capable of modulating the luminescent color itself may be, for example, a combination of a light emitting element that emits light including multiple wavelengths such as a fluorescent lamp, and a light modulating element capable of adjusting the transmittance of light for each wavelength such as a liquid crystal panel having color filters arranged in an array form.

According to the control signal from the processor 14, the illumination light source 13 changes the feature of the emitted light in time series with a period having a predetermined time length according to the light emission pattern corresponding to the value of the symbol included in the information to be transmitted, so as to superimpose information on the light emitted from the illumination light source 13.

The processor 14 is an example of a controller and includes, for example, a central processing unit (CPU) and its peripheral circuit. The processor 14 controls the entire transmission apparatus 1. When receiving the identification information of the reflecting object 5 via the communication interface 11, the processor 14 temporarily stores the identification information in the memory 12. Then, when performing the transmission process, the processor 14 reads the identification information of the reflecting object 5 from the memory 12 and divides the identification information in a symbol unit. Then, the processor 14 reads the waveform data representing the light emission pattern corresponding to the value of the symbol, for each symbol, from the memory 12. The processor 14 controls the illumination light source 13 to change the feature of the light emitted from the illumination light source 13 in time series according to the light emission pattern.

In addition, the timing for performing the transmission process may be preset. Alternatively, the processor 14 may start the transmission process by an operation from a user interface (not illustrated) or according to a signal for instructing the start of the transmission process which is received from another apparatus via the communication interface 11. In addition, the processor 14 may repeatedly perform the transmission process in a regular period.

For example, as for the scheme of modulating the light emission pattern corresponding to the value of the symbol, the processor 14 may use various modulation schemes which are used in the wireless communication. For example, the processor 14 may associate one symbol with one bit. In this case, the processor 14 inverts the phase by 180° between the light emission pattern in which the symbol value corresponds to '0' and the light emission pattern in which the symbol value corresponds to '1' as in the binary phase-shift keying (BPSK).

In addition, the processor 14 may associate two bits with one symbol. In this case, for example, the processor 14 may set the light emission pattern in which the feature of the light changes periodically according to the quadriphase phase-shift keying (QPSK). That is, the processor 14 may set the light emission pattern in which the feature of the light changes periodically in the manner that the phase varies by 90° for each of the four values ('00', '01', '10,' and '11') which may be taken by the symbol.

Figure 3:
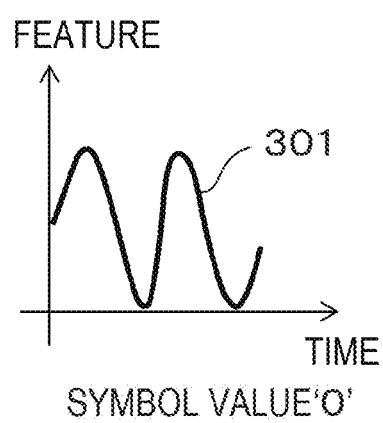
FIG. 3 is a view illustrating an example of a relationship between a light emission pattern and a value of a symbol to be superimposed, by a phase modulation scheme.
Figure 3:
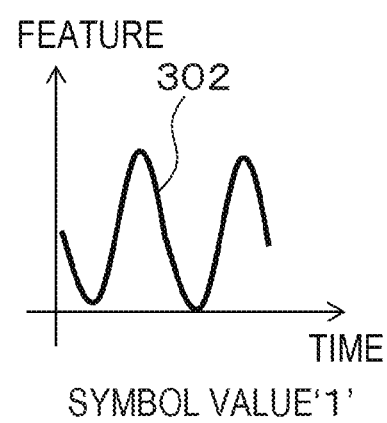

FIG. 3 is a view illustrating an example of the relationship between the light emission pattern and the value of the symbol to be superimposed, according to the phase modulation scheme. In FIG. 3, the horizontal axis represents time, and the vertical axis represents the feature of the light emitted from transmission apparatus 1 (e.g., luminance or color). Light emission patterns 301 and 302 correspond to the symbol values '0' and '1,' respectively. In both of the light emission patterns 301 and 302, while the feature of the light changes periodically with the elapse of time, the phase is shifted by 180° from each other. In this way, the transmission apparatus 1 may superimpose information on the light emitted by the illumination light source 13, by making the phase in the time variation of the feature of the light different for each symbol value. In addition, the relationship between the light emission pattern and the symbol value is not limited to this example.

In the present embodiment, the light emission pattern is the periodically varying pattern in which the feature of the light changes in the sine wave form with the elapse of time as represented in, for example, FIG. 3. The light emission pattern is not limited to this example and may be, for example, a pattern in which the feature of the light varies periodically in a triangular form or a rectangular pulse form.

One period of the light emission pattern, that is, a first time length, is set to, for example, several times a reciprocal of a photographing rate of the image capturing unit included in the reception apparatus 2, such that the reception apparatus can reproduce the waveform of the light emission pattern even at the photographing rate. For example, the first time length may be several tens of milliseconds to several hundreds of milliseconds (i.e., a first frequency corresponding to the first time length is several Hz to several tens of Hz).

The processor 14 divides the information to be transmitted in, for example, a bit string unit having one or more bits, and sets each bit string as a single symbol. The processor 14 reads the waveform data representing the light emission pattern according to the value of the symbol from the memory 12. Then, the processor 14 sets a time period having a predetermined length, for each symbol. The processor 14 causes the illumination light source 13 to repeat the light emission pattern corresponding to the symbol value for one to several periods in the time period.

In addition, the processor 14 may cause a predetermined symbol string (e.g., '01010101') to be included at a predetermined position of the information to be transmitted, for example, at the beginning as a preamble. Alternatively, the processor 14 may cause an error detection code such as a cyclic redundancy check (CRC) code to be included in the information to be transmitted. When the processor 14 causes the symbol string or the error detection code to be included in the information to be transmitted, the reception apparatus 2 easily and accurately decodes the transmitted information.

In addition, the processor 14 may modulate the feature of the light emitted from the illumination source 13 according to another modulation scheme. For example, the processor 14 may modulate the feature of the light emitted from the illumination source 13 according to a frequency modulation scheme. In this case, the processor 14 may change the length of one period of the light emission pattern according to the value of the symbol.

Figure 4:
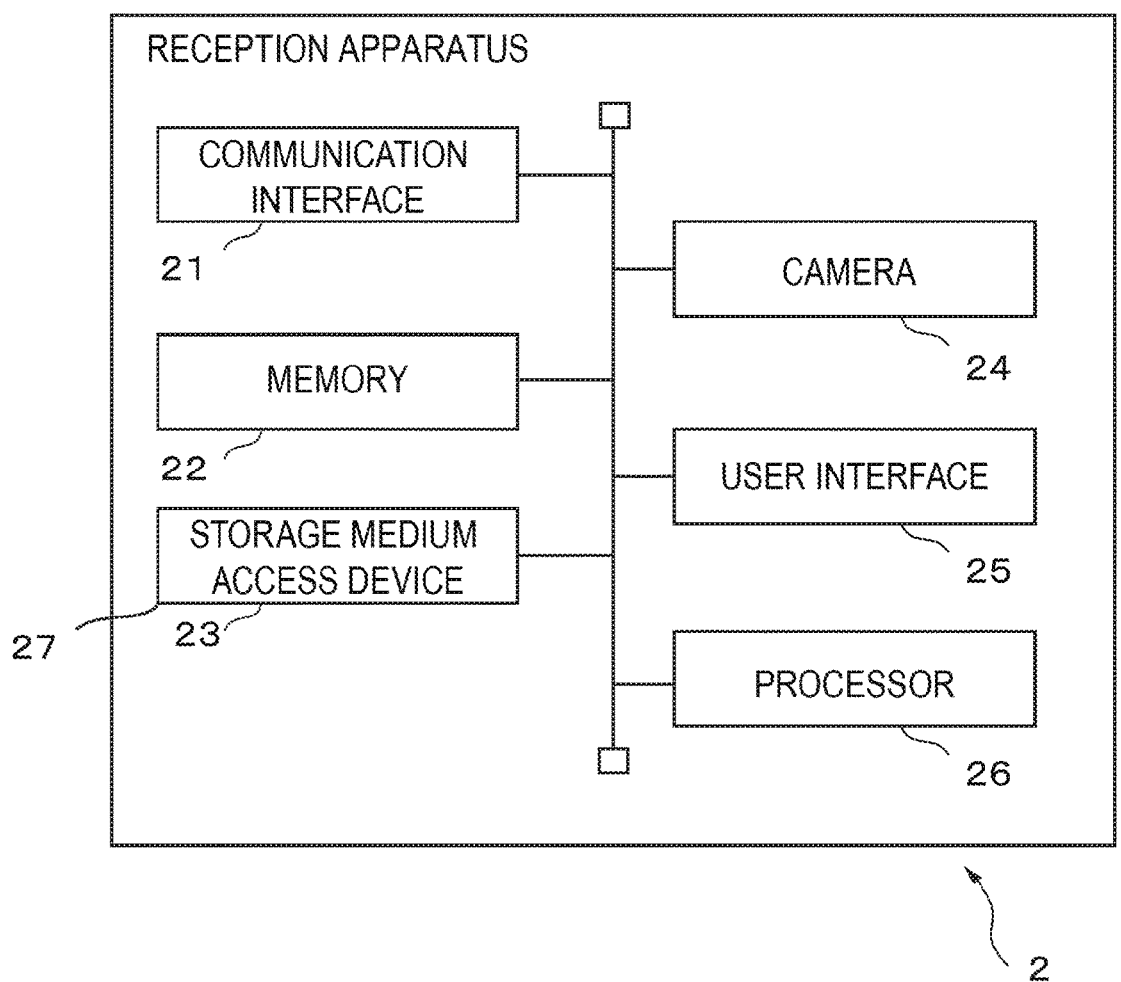
FIG. 4 is a hardware configuration diagram of a reception apparatus used in the communication system illustrated in FIG. 1.

Next, the reception apparatus 2 will be described. FIG. 4 is a hardware configuration diagram of the transmission apparatus 2. The reception apparatus 2 may be, for example, a portable terminal or a stationary type device which has a camera. The reception apparatus 2 includes a communication interface 21, a memory 22, a storage medium access device 23, a camera 24, a user interface 25, and a processor 26. The reception apparatus 2 analyzes a plurality of images obtained by photographing a photographing range including at least a part of the region irradiated by the light from the transmission apparatus 1, with the camera 24 several times in time series at a predetermined photographing rate. As a result, the reception apparatus 2 decodes the information transmitted by the transmission apparatus 1 by being superimposed on the light emitted from the illumination light source 13 (the identification information of the reflecting object 5 in the present embodiment).

The communication interface 21 includes, for example, a communication interface for connecting the reception apparatus 2 to the communication network 4, and a control circuit thereof. The communication interface 21 transmits the decoded identification information of the reflecting object 5 which is received from the processor 26, to the server 3 via the communication network 4. Further, the communication interface 21 transfers the information received from the server 3, to the processor 26.

The memory 22 is an example of a storage unit and includes, for example, a non-volatile semiconductor memory dedicated for reading and a writable and readable volatile semiconductor memory. The memory 22 stores, for example, the plurality of images generated by the camera 24 in time series during the performance of the reception process. Further, the memory 22 stores various kinds of information and programs to be used by the processor 26 for performing the reception process. In addition, the memory 22 may store the information transmitted by the transmission apparatus 1 and then decoded.

The storage medium access device 23 is, for example, a device for accessing a storage medium 27 such as a magnetic disk, a semiconductor memory card, or an optical storage medium. The storage medium access device 23 reads a computer program stored in the storage medium 27 to be executed on the processor 26 for the reception process, and transfers the program to the processor 26.

The camera 24 is an example of an image capturing unit and includes, for example, an image sensor formed by a two-dimensional array of solid-state imaging elements having sensitivity to the light emitted by the illumination light source 13 of the transmission apparatus 1 such as a CCD or CMOS, and an optical image forming system for forming an image of the photographing range on the image sensor. The photographing range includes at least a part of the range irradiated by the light emitted from the illumination light source 13. The reception apparatus 2 may be disposed such that the illumination light source 13 of the transmission apparatus 1 or the reflecting object 5 is included in the photographing range. The camera 24 performs photographing at a predetermined photographing rate while the reception apparatus 2 is performing the reception process, so as to generate an image each time the photographing is performed. The predetermined photographing rate may be, for example, a photographing rate corresponding to the time period equal to or less than ½ of the first time length. In the present embodiment, the image generated by the camera 24 is a color image.

Each time the camera 24 generates the image, the camera 24 outputs the image to the processor 26.

The user interface 25 includes, for example, a display device and an operation button. Alternatively, the user interface 25 may have a touch panel display. The user interface 25 outputs an operation signal corresponding to an operation by a human, for example, an operation signal for instructing the start of the reception process, to the processor 26. Further, the user interface 25 displays, for example, various kinds of information and the composite image received from the processor 26.

The processor 26 includes a CPU and its peripheral circuit. The processor 26 controls the entire reception apparatus 2. The processor 26 frequency-analyzes the plurality of images generated by the camera 24 in time series so as to decode the information transmitted from the transmission apparatus 1.

Figure 5:
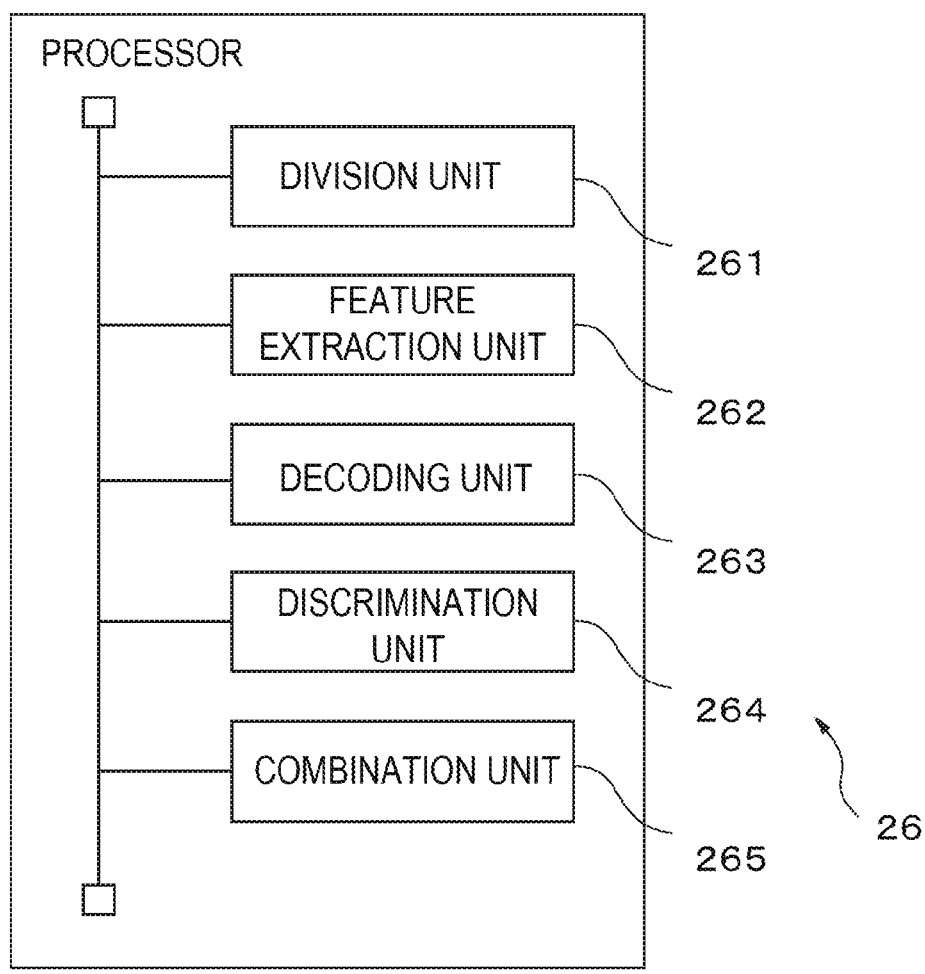
FIG. 5 is a functional block diagram of a processor of the reception apparatus with respect to a discrimination process including a reception process.

FIG. 5 is a functional block diagram of the processor 26 on a discrimination process including the reception process. The processor 26 includes a division unit 261, a feature extraction unit 262, a decoding unit 263, a discrimination unit 264, and a combination unit 265. These respective units of the processor 26 are, for example, software modules implemented by the computer program operating on the processor 26. Alternatively, the respective units of the processor 26 may be mounted as a firmware for implementing the functions of the respective units in the reception apparatus 2. The reception process is performed by the division unit 261, the feature extraction unit 262, and the decoding unit 263.

Figure 6:
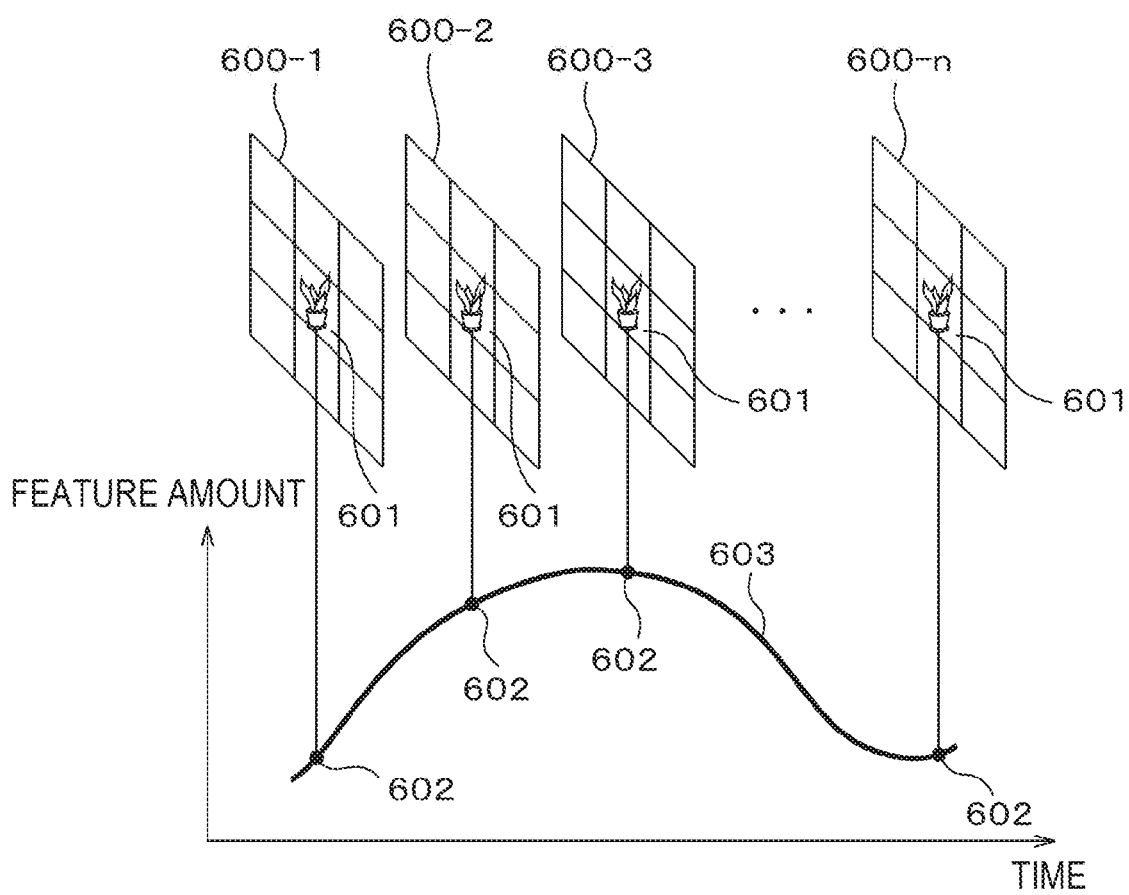
FIG. 6 is a conceptual view of the reception process with respect to information superimposed by a light emission pattern.

FIG. 6 is a conceptual view of the reception process on the information superimposed by the light emission pattern. Assuming that the object illuminated by the light from the illumination light source 13 of the transmission apparatus 1 is photographed in each image generated by the camera 24, the pixel value included in the region where the object is photographed is affected by the change of the feature of the light emitted from the illumination light source 13. Thus, each of images 600-1, 600-2, 600-3, . . . , and 600-$n$ generated by the camera 24 is divided into a plurality of regions 601. Then, a feature amount 602 representing the feature of the light emitted from the illumination light source 13 is extracted from each region, and a light emission pattern 603 is specified by studying the change of the feature amount 602 in time. Accordingly, the reception apparatus 2 may decode the value of the symbol corresponding to the light emission pattern 603.

The division unit 261 divides each image into the plurality of regions. For example, the division unit 261 may divide each image into two to four regions in each of the horizontal and vertical directions. In addition, the division unit 261 may divide each image by multiple division methods. For example, the division unit 261 may divide each image into two regions in each of the horizontal and vertical directions so as to set four regions for each image, and further, may divide each image into three regions in each of the horizontal and vertical directions so as to set nine regions for each image. As a result, it is possible to increase the probability of setting a region where the reflecting object 5 is represented or a region which is mostly occupied by the illumination light source 13 itself of the transmission apparatus 1. The division unit 261 transfers the information representing each region of each image (e.g., a position of a boundary among regions) to the feature extraction unit 262.

The feature extraction unit 262 extracts the feature amount representing the feature of the light changing in time series according to the light emission pattern of the light emitted from the illumination light source 13 of the transmission apparatus 1, from each region of each image. For example, when the feature of the light changing in time series is the luminance, the feature extraction unit 262 extracts an average value or a median of the luminance values of the pixels of each region as the feature amount. In addition, when the feature of the light changing in time series is the luminescent color, the feature extraction unit 262 converts the value of each pixel of each region into a value of a YUV or HLS color space, and calculates an average value or a median of the color components of each pixel (e.g., a U component, a V component or color) as the feature amount. In addition, when the value of each pixel of the image obtained by the camera 24 is represented in an RGB color space, the feature extraction unit 262 converts the value of each pixel of the image into the value of the YUV or HLS color space, so as to calculate the average value or the median of the color components. In addition, the feature amount is not limited to the example described above, and the feature extraction unit 262 may extract various feature amounts changing in time series according to the feature of the light changing with the light emission pattern, for example, a total sum, a distribution or a standard deviation of the luminance values within a region or specific color components, as the feature amount. Alternatively, the feature extraction unit 262 may extract an in-range average value of difference values each obtained between pixel values of pixels present at the same position in two images consecutive in time, as the feature amount.

The feature extraction unit 262 transfers the feature amount on the light emission pattern for each region of each image, to the decoding unit 263.

The decoding unit 263 specifies the light emission pattern from the time-series change of the feature amount extracted for each region, and decodes the value of the symbol corresponding to the light emission pattern. Then, the decoding unit 263 specifies the region where the transmitted information has been decoded, on each image.

As described above, when the feature of the light emitted from the illumination light source 13 of the transmission apparatus 1 periodically varies according to the light emission pattern, the time variation of the feature amount of the region where the object illuminated by the transmission apparatus 1 is photographed has a frequency component in a time axis direction according to the variation period of the light emission pattern. For example, as illustrated in FIG. 3, when the feature of the light from the transmission apparatus 1 varies in the sine wave form, the frequency component of the feature amount in the time axis direction includes a specific frequency component corresponding to the sine wave. Similarly, even when the feature of the light from the transmission apparatus 1 varies in the triangular wave or rectangular pulse form, the frequency component of the feature amount in the time axis direction includes a specific frequency component corresponding to the triangular wave or the rectangular pulse.

Accordingly, per series of regions where the same object is photographed with respect to a plurality of images included in a focused time period having the same length as the time period corresponding to one symbol, the decoding unit 263 arranges feature amounts extracted from the series of regions in time series and creates a one-dimensional vector. In addition, when the positions of the illumination light source 13 of the transmission apparatus 1 and the reception apparatus 2 are fixed and the reflecting object 5 is stationary, it may be assumed that the series of regions where the same object is photographed in the plurality of images may be regions located at the same position on the respective images. In addition, as in a case where a user holds the reception apparatus 2 by his/her hand, the relative position of the reception apparatus 2 with respect to the illumination light source 13 of the transmission apparatus 1 and the reflecting object 5 may change. In this case, the decoding unit 263 may specify the series of regions where the same object is photographed, by performing a tracking process among the plurality of images. Then, the decoding unit 263 Fourier-transforms the one-dimensional vector. Then, the decoding unit 263 extracts a spectrum of a frequency corresponding to the period of the light emission pattern from the obtained frequency component, per series of regions. For example, when the information is superimposed by the phase modulation scheme, the decoding unit 263 may extract a spectrum of one frequency which is the same as the period of the light emission pattern. In addition, when the information is superimposed by the frequency modulation scheme, the decoding unit 263 may extract a spectrum of a frequency corresponding to each symbol.

The decoding unit 263 specifies a series of regions where an amplitude level of the extracted spectrum is equal to or larger than a predetermined threshold value. In addition, the number of the specified series of regions is not limited to one, and plural sets of a series of regions may be specified. Especially, it is assumed that when both the illumination light source 13 and the reflecting object 5 are photographed in each image, two sets of a series of regions are specified.

When the information is superimposed by the frequency modulation scheme, the decoding unit 263 may select a series of regions where the amplitude level of the spectrum of one of the plurality of extracted frequencies is equal to or larger than the predetermined threshold value. As a result, the decoding unit 263 may specify the series of regions where the reflecting object 5 or the illumination light source 13 itself of the transmission apparatus 1 is photographed. Then, the decoding unit 263 detects a component having a value corresponding to the light emission pattern from the extracted spectrum for the specified series of regions. When the information is superimposed by the phase modulation scheme, the component having the value corresponding to the light emission pattern is, for example, a phase of a periodic variation of the feature of the light at a predetermined time point within the focused time period (e.g., a starting or ending time point of the focused time period).

In addition, the time period set by the transmission apparatus 1 for each symbol may be deviated from the focused time period. Thus, the decoding unit 263 detects the phase at the predetermined time point for each focused time period, by performing the process described above while making the focused time period deviated by one frame in time series. In this case, when the focused time period and the time period set by the transmission apparatus 1 for each symbol are consistent with each other, the value of the detected phase becomes the value corresponding to one of the symbols, so that the decoding unit 263 may take the value of the phase as a phase value corresponding to the light emission pattern. Further, when the focused time period and the time period set by the transmission apparatus 1 for each symbol are consistent with each other, the decoding unit 263 may set a subsequent focused time period based on the focused time period. Then, the decoding unit 263 detects the phase corresponding to the light emission pattern for each focused time period.

In addition, when the information is superimposed by the frequency modulation scheme, the decoding unit 263 takes the frequency at which the amplitude level of the spectrum is equal to or larger than the predetermined threshold value, as the component having the value corresponding to the light emission pattern, for the selected regions.

In this case as well, the time period set by the transmission apparatus 1 for each symbol may be deviated from the focused time period. Thus, the decoding unit 263 performs the process described above while making the focused time period deviated by one frame in time series, so as to detect the amplitude level of the frequency corresponding to each light emission pattern for each focused time period. In this case, when the focused time period and the time period set by the transmission apparatus 1 for each symbol are consistent with each other, the amplitude level of the frequency corresponding to any one light emission pattern becomes the maximum value, so that the decoding unit 263 may take the frequency corresponding to the maximum value as the frequency corresponding to the light emission pattern. Further, when the focused time period and the time period set by the transmission apparatus 1 for each symbol are consistent with each other, the decoding unit 263 may set a subsequent focused time period based on the focusing time period. Then, the decoding unit 263 detects the frequency corresponding to the light emission pattern for each focused time period.

In addition, the decoding unit 263 may specify the light emission pattern by a method other than the method described above. For example, the decoding unit 263 may specify the light emission pattern by obtaining a difference value of the feature amounts between images adjacent to each other in time, within the focused time period, and checking the increase/decrease of the feature amounts based on the difference value.

The decoding unit 263 arranges the detected components in a sequential order. As described above, when the information to be transmitted includes the predetermined symbol string (e.g., '01010101') as the preamble, the decoding unit 263 extracts a part matching the symbol string corresponding to the preamble from the arrangement of the detected components. Then, the decoding unit 263 may associate the detected component of the extracted part and the value of the symbol with each other such that the detected component and the value of the symbol match with each other.

Alternatively, when the information to be transmitted includes an error detection code such as a CRC code, the decoding unit 263 may associate the detected component and the value of the symbol with each other such that the error of the symbol is minimized by using the error detection code.

In addition, the decoding unit 263 may obtain the value of the symbol corresponding to the detected component, by referring to a reference table representing the association relationship between the detected component and the value of the symbol. In addition, the reference table is stored in advance in, for example, the memory 22.

The decoding unit 263 decodes the transmitted information (the identification information of the reflecting object 5 in the present embodiment) by arranging the values of the decoded symbols in a predetermined order, for example, in a sequential order. Then, the decoding unit 263 stores the decoded information in the memory 22.

In addition, when the series of regions where the same information has been decoded exists in plural sets, the decoding unit 263 may perform a labeling process on the plural sets of the series of regions. In addition, when the number of labels allocated to the plural sets of the series of regions is one, that is, when the plural sets of the series of regions are adjacent to each other, the decoding part 263 may take the plural sets of the series of regions as one set of a series of regions.

The decoding unit 263 notifies each set of the series of regions where the information has been decoded, to the discrimination unit 264.

The discrimination unit 264 discriminates whether either the illumination light source 13 of the transmission apparatus 1 or the reflecting object 5 is photographed in the series of regions where the transmitted information has been decoded, over the plurality of images.

When the reflecting object 5 has a spectral reflection characteristic having a different reflectance according to colors, the color of received light changes in a case of receiving the light emitted from the illumination light source 13 and reflected by the reflecting object 5, as compared with a case of directly receiving the light emitted from the illumination light source 13.

Figure 7:
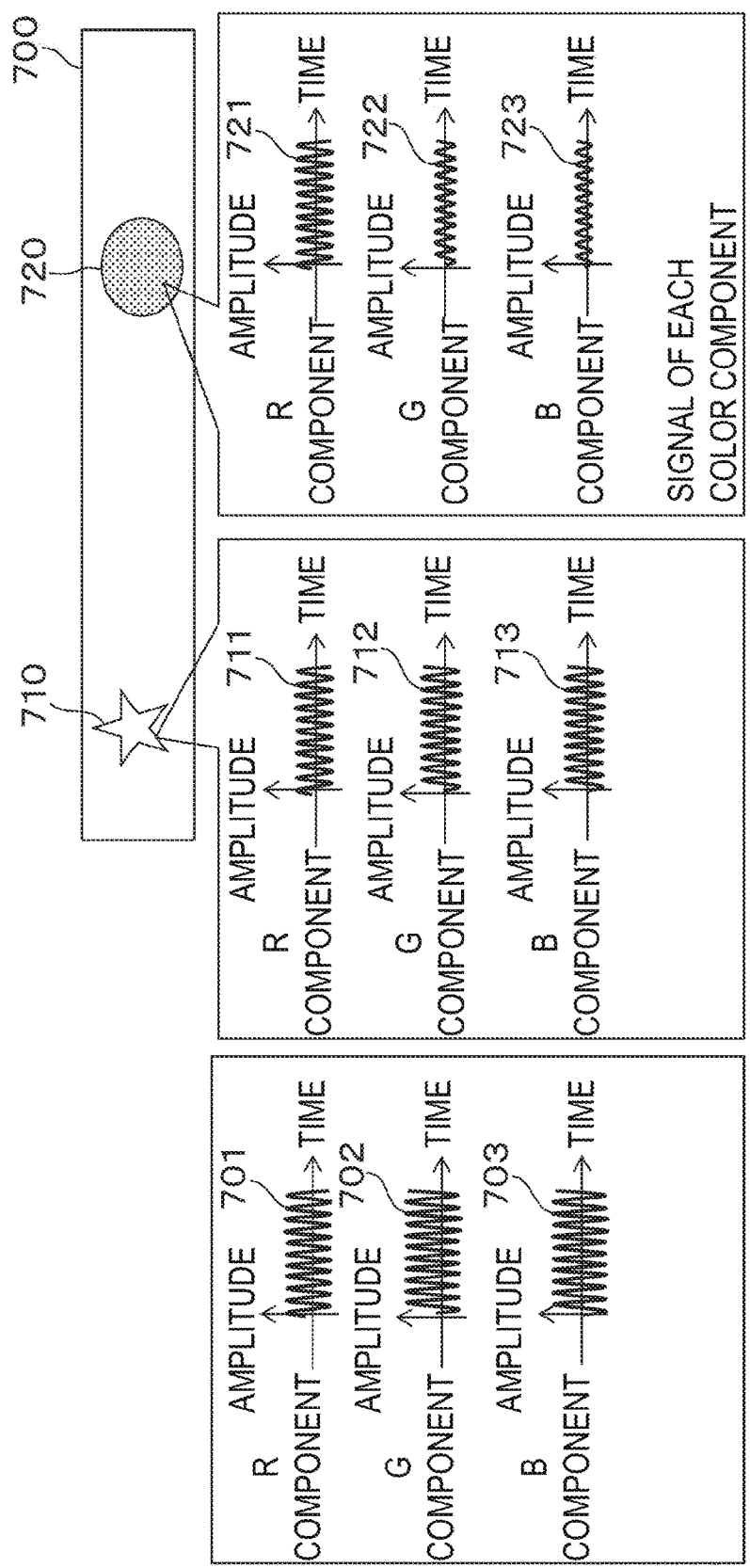
FIG. 7 is a view for explaining a change of a color by a reflecting object.

FIG. 7 is a view for explaining the change of the color by the reflecting object. The ratios of the amplitudes of a red component 701, a green component 702, and a blue component 703 of the light emitted from the illumination light source 13 are substantially the same as the ratios of the amplitudes of a red component 711, a green component 712, and a blue component 713 in a region 710 of an image 700 where the illumination light source 13 is photographed, respectively. Meanwhile, for example, it is assumed that the reflecting object 5 has the spectral reflection characteristic in which the reflectance for red is higher than the reflectance for blue and green. In this case, in a region 720 of the image 700 where the reflecting object 5 is photographed, the amplitude of a red component 721 is larger than the amplitudes of a green component 722 and a blue component 723. As a result, the color of the region 720 becomes red, as compared to the color of the region 710.

Accordingly, per series of regions where the transmitted information has been decoded, the discrimination unit 264 obtains, as an amplitude, ½ of a difference between the maximum and minimum values of each color component for each corresponding pixel in the series of regions, and calculates an average value of the amplitudes in the entire regions. In addition, the illumination light source 13 of the transmission apparatus 1 or the reflecting object 5 may be photographed in a part of the regions. Accordingly, per series of regions where the transmitted information has been decoded, the discrimination unit 264 may calculate the amplitude of each color component for a predetermined number of pixels (e.g., 10% to 20% of the total number of the pixels included in a region) in a decreasing order of the luminance value within the series of regions. Then, per series of regions where the transmitted information has been decoded, the determination unit 264 may calculate the average value of the amplitudes of each color component in the entire regions. The discrimination unit 264 calculates a vector of each color component having the average value of the amplitudes of the color component as an element.

Alternatively, per series of regions where the transmitted information has been decoded, the discrimination unit 264 may calculate an average value of the intensity of each color component for each corresponding pixel in the series of regions, and may further average the average value of the intensity of the color component in the entire regions. Then, per series of regions where the transmitted information has been decoded, the discrimination unit 264 may calculate a vector of each color component having the average value of the intensity of the color component as an element.

In addition, the discrimination unit 264 normalizes the respective elements of the vectors of the color components to any one of the elements, so as to calculate a normalized vector of the color components. For example, when the element representing the red component is $A_R$, the element representing the green component is $A_G$, and the element representing the blue component is $A_B$, the discrimination unit 264 calculates ($A_R/A_R$, $A_G/A_R$, $A_B/A_R$) as the normalized vector of the color components.

Per series of regions where the transmitted information has been decoded, the discrimination unit 264 calculates a similarity between the color of the series of regions and the color of the light emitted from the illumination light source 13 of the transmission apparatus 1. As for the similarity, for example, the discrimination unit 264 may calculate a cosine similarity between the normalized vector of the color components calculated for the series of regions and the normalized vector of the color components of the light emitted from the illumination light source 13 of the transmission apparatus 1. In addition, per series of regions where the transmitted information has been decoded, the discrimination unit 264 may calculate a cosine similarity between the vector of the color components on the series of regions and the vector of the color components of the light emitted from the illumination light source 13 of the transmission apparatus 1, as the similarity. Alternatively, per series of regions where the transmitted information has been decoded, the discrimination unit 264 may calculate a difference between the average value of the amplitudes of each color component on the series of regions, and the amplitude of the corresponding color component of the light emitted from the illumination light source 13. In addition, as for the similarity, the determination unit 264 may calculate the reciprocal of the value ($\Sigma d2+\alpha$) obtained by adding an offset value a (e.g., $\alpha=1$) to the square sum $\Sigma d^2$ of the difference for each color component. By calculating the similarity in this way, the discrimination unit 264 may accurately evaluate the similarity between the color of the series of regions where the transmitted information has been decoded and the color of the light emitted from the illumination light source 13.

In addition, the vectors or normalized vector of the color components of the light emitted from the illumination light source 13 of the transmission apparatus 1 is stored in advance in, for example, the memory 22. Alternatively, the reception apparatus 2 may receive the vectors or normalized vector of the color components of the light emitted from the illumination light source 13 of the transmission apparatus 1, from the server 3 via the communication network 4. At this time, the server 3 may store the identification information of the reflecting object 5 and the vectors or normalized vector of the color components on the illumination light source 13 illuminating the reflecting object 5 in association with each other. Then, the determination unit 264 may transmit the decoded information (the identification information of the reflecting object 5 in the present example) to the server 3, and the server 3 may transmit the vectors or normalized vector of the color components on the illumination light source 13, which corresponds to the received information, to the reception apparatus 2. The vectors or normalized vector of the color components on the illumination light source 13 is an example of the information representing the color of the light emitted from the illumination light source 13. Thus, even when the reception apparatus 2 does not see the color of the light emitted from the illumination light source 13, the reception apparatus 2 may calculate the similarity between the color of the region of the image where the information has been decoded and the color of the light emitted from the illumination light source 13.

In addition, the amplitude or intensity of each color component of the light emitted from the illumination light source 13, which is used as the value of each element of the vectors or normalized vector of the color components on the illumination light source 13, may be, for example, the amplitude or intensity of each color component in one period of the light emission pattern.

When there exist two sets of the series of regions where the transmitted information has been decoded, the discrimination unit 264 determines that the illumination light source 13 is photographed in the series of regions having the relatively high similarity, and determines that the reflecting object 5 is photographed in the series of regions having the relatively low similarity.

Meanwhile, when there exists one set of the series of regions where the transmitted information has been decoded, the discrimination unit 264 compares the similarity with a predetermined threshold value. When the similarity is higher than the predetermined threshold value, the discrimination unit 264 determines that the illumination light source 13 is photographed in the series of regions. Meanwhile, when the similarity is equal to or less than the predetermined threshold value, the discrimination unit 264 determines that the reflecting object 5 is photographed in the series of regions. In addition, when the similarity is equal to the predetermined threshold value, the discrimination unit 264 may determine that the illumination light source 13 is photographed in the series of regions. In addition, the predetermined threshold value is stored in advance in the memory 22. As a result, the discrimination unit 264 may discriminate which of the illumination light source 13 and the reflecting object 5 is photographed in the series of regions where the transmitted information has been decoded.

In addition, the reflecting object 5 may have the spectral reflection characteristic in which the reflectance is substantially consistent for each color, like white or gray. In this case, the color of received light in a case of directly receiving the light emitted from the illumination light source 13 becomes substantially the same as the color of received light in a case of receiving the light emitted from the illumination light source 13 and reflected by the reflecting object 5.

Accordingly, when it is known to the reception apparatus 2 that the reflecting object 5 has the spectral reflection characteristic in which the reflectance is substantially consistent for each color, the discrimination unit 264 calculates an average value of the luminance of each pixel included in the series of regions where the transmitted information has been decoded, per series of regions. At this time, the discrimination unit 264 may obtain the luminance value of each pixel by converting the value of each pixel within the series of regions into from the RGB color representation system into the YUV color representation system. In addition, when there exist two sets of the series of regions where the transmitted information has been decoded, the discrimination unit 264 determiners that the illumination light source 13 is photographed in the series of regions having the relatively high average value of the luminance, and determines that the reflecting object 5 is photographed in the series of regions having the relatively low average value of the luminance.

Meanwhile, when there exists one set of the series of regions where the transmitted information has been decoded, the discrimination unit 264 compares the average value of the luminance with a predetermined luminance threshold value. Then, when the average value of the luminance is higher than the predetermined luminance threshold value, the discrimination unit 264 determines that the illumination light source 13 is photographed in the series of regions. Meanwhile, when the average value of the luminance is equal to or less than the predetermined luminance threshold value, the discrimination unit 264 determines that the reflecting object 5 is photographed in the series of regions. In addition, when the average value of the luminance is equal to the predetermined luminance threshold value, the discrimination unit 264 may determine that the illumination light source 13 is photographed in the series of regions. In addition, the predetermined luminance threshold value is stored in advance in the memory 22.

In addition, per series of regions where the transmitted information has been decoded, the discrimination unit 264 may calculate the average value of the amplitudes of each color component, instead of the average value of the luminance. Then, when there exist two sets of the series of regions where the transmitted information has been decoded, the discrimination unit 264 may determine that the illumination light source 13 is photographed in the series of regions having the relatively high average value of the amplitudes of each color component. Meanwhile, the discrimination unit 264 may determine that the reflecting object 5 is photographed in the series of regions having the relatively low average value of the amplitudes of each color component. In addition, when there exists one set of the series of regions where the transmitted information has been decoded, the discrimination unit 264 may determine that the illumination light source 13 is photographed in the series of regions in a case where the average value of the amplitudes of each color component is higher than a predetermined amplitude threshold value. Meanwhile, in a case where the average value of the amplitudes of each color component is equal to or less than the predetermined amplitude threshold value, the discrimination unit 264 may determine that the reflecting object 5 is photographed in the series of regions.

Alternatively, per series of regions where the transmitted information has been decoded, the discrimination unit 264 may calculate a sum of the similarity between the color of the series of regions and the color of the light emitted from the illumination light source 13 of the transmission apparatus 1, and the average value of the amplitudes or the luminance of each color component, as an index value. In addition, for example, each weight coefficient may be set such that the weight coefficient for the similarity is larger than the weight coefficient for the average value of the amplitudes or the luminance of each color component. As a result, the discrimination unit 264 may increase the contribution of the spectral reflection characteristic of the reflecting object 5 to the index value.

Then, when there exist two sets of the series of regions where the transmitted information has been decoded, the discrimination unit 264 may determine that the illumination light source 13 is photographed in the series of regions having the relatively high index value. Meanwhile, the discrimination unit 264 may determine that the reflecting object 5 is photographed in the series of regions having the relatively low index value. In addition, when there exists one set of the series of regions where the transmitted information has been decoded, the discrimination unit 264 may determine that the illumination light source 13 is photographed in the series of regions in a case where the index value is higher than a predetermined index threshold value. Meanwhile, in a case where the index value is equal to or less than the predetermined index threshold value, the discrimination unit 264 may determine that the reflecting object 5 is photographed in the series of regions. In this case as well, in a case where the index value is equal to the predetermined index threshold value, the discrimination unit 264 may determine that the illumination light source 13 is photographed in the series of regions. By using the index value, even when the spectral reflection characteristic of the reflecting object 5 is unknown and the spectral reflection characteristic has substantially the same reflectance for each color, the discrimination unit 264 may accurately discriminate which of the illumination light source 13 and the reflecting object 5 is photographed.

Per series of regions where the transmitted information has been decoded, the discrimination unit 264 notifies the combination unit 265 of the discrimination result as to which of the illumination light source 13 and the reflecting object 5 is photographed in the series of regions.

The combination unit 264 transmits the decoded identification information of the reflecting object 5 to the server 3 via the communication interface 21 and the communication network 4. Then, the combination unit 265 receives related information on the identification information of the reflecting object 5, for example, texts or pictures representing the feature of the reflecting object 5, from the server 3 via the communication network 4 and the communication interface 21.

Each time an image is obtained by the camera 24, the combination unit 265 generates a composite image by superimposing the received related information on a position having a predetermined positional relationship with the region where the reflecting object 5 is photographed, on the image. With the composite image, it may be clarified that the related information of the reflecting object 5 represents the reflecting object 5. In addition, the predetermined positional relationship may be, for example, a positional relationship in which the region where the reflecting object 5 is photographed and the related information overlap with each other, or a positional relationship in which the region and the related information are adjacent to each other. In addition, the relative positional relationship between the reflecting object 5 and the reception apparatus 2 may change. In this case, the combination unit 265 may specify the region where the reflecting object 5 is photographed in the latest image, by performing the tracking process between the plurality of images including the series of regions determined to photograph the reflecting object 5, and the latest image.

The combination unit 265 causes a display device of the user interface 25 to display the composite image each time the composite image is generated.

In addition, when there is no region where the reflecting object 5 is photographed, the combination unit 265 may not generate the composite image. Then, the combination unit 265 may cause the display device of the user interface 25 to display the image itself received from the camera 24.

Figure 8:
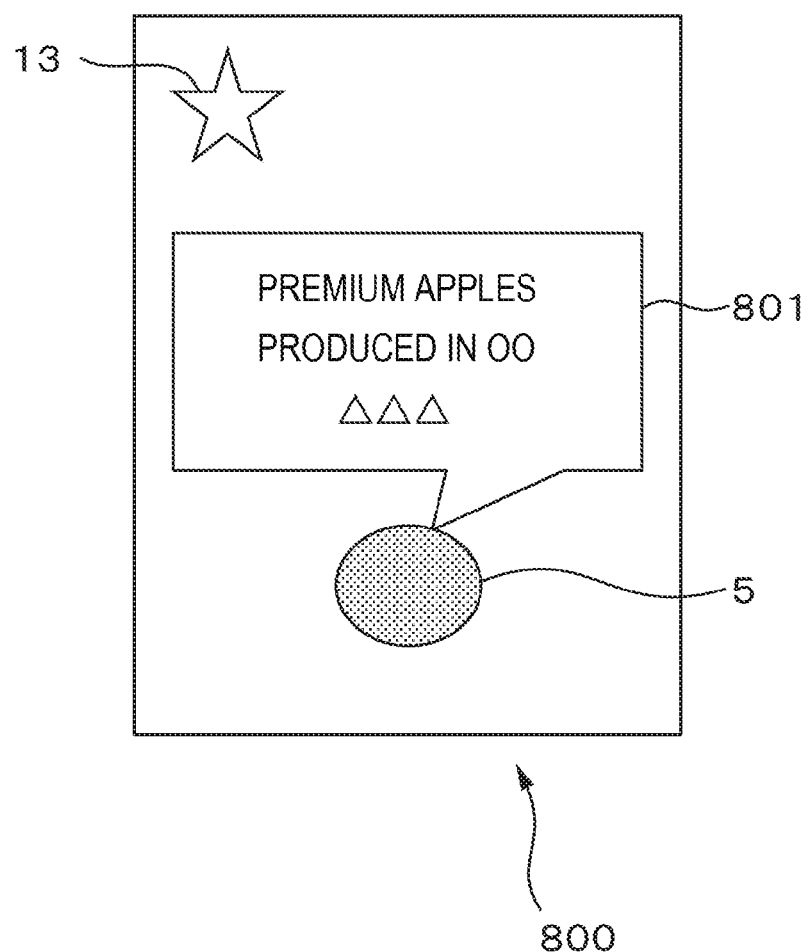
FIG. 8 is a view illustrating an example of a composite image.

FIG. 8 is a view illustrating an example of the composite image displayed in the user interface 25. In a composite image 800, both the illumination light source 13 of the transmission apparatus 1 and the reflecting object 5 are photographed. However, the region where the reflecting object 5 is photographed is specified by the process described above. Thus, in the composite image 800, information 801 related to the reflecting object 5 is displayed in association with the reflecting object 5.

Figure 9:
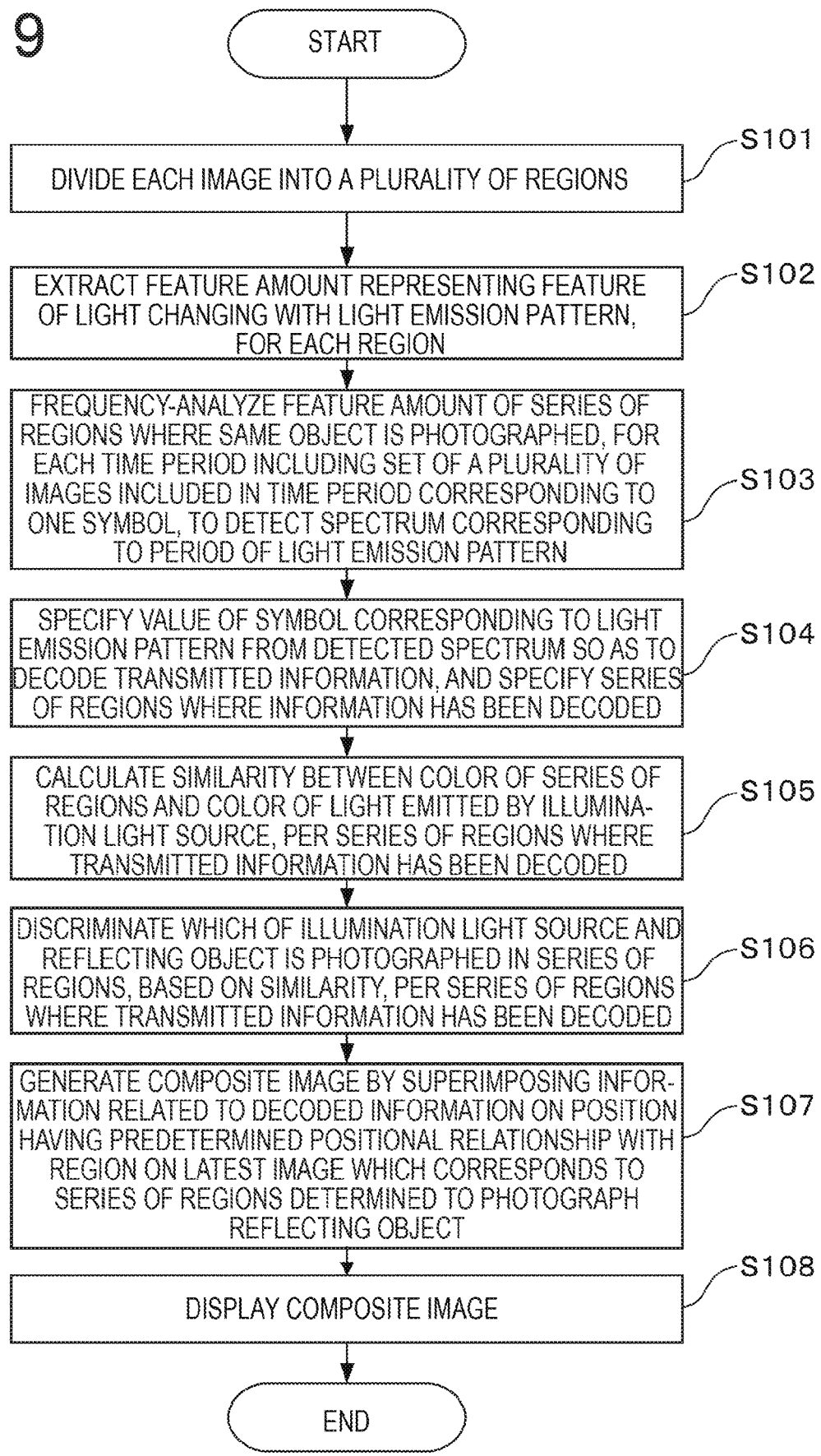
FIG. 9 is an operation flowchart of the discrimination process including the reception process, which is performed by the reception apparatus.

FIG. 9 is an operation flowchart of the discrimination process including the reception process which is performed by the reception apparatus 2. The reception process includes operations S101 to S104.

The division unit 261 of the processor 26 divides each image into a plurality of regions (operation S101). Then, the feature extraction unit 262 of the processor 26 extracts a feature amount representing the feature of the light changing with the light emission pattern for each region (operation S102).

For each time period including a set of the plurality of images included in the time period corresponding to one symbol, per series of regions where the same object is photographed, the decoding unit 263 frequency-analyzes the feature amount on the light emission pattern in the series of regions. As a result, the decoding unit 263 detects the spectrum corresponding to the period of the light emission pattern (operation S103). Then, for the each time period, the decoding unit 263 specifies the value of the symbol corresponding to the light emission pattern from the detected spectrum, so as to decode the transmitted information, and further, specifies the series of regions where the information has been decoded (operation S104).

Per series of regions where the transmitted information has been decoded, the discrimination unit 264 calculates the similarity between the color of the series of regions and the color of the light emitted by the illumination light source 13 of the transmission apparatus 1 (operation S105). Then, per series of regions where the transmitted information has been decoded, the discrimination unit 264 discriminates which of the illumination light source 13 and the reflecting object 5 is photographed in the series of regions, based on the similarity (operation S106). In addition, as described above, the discrimination unit 264 may use the average value of the illuminance or the index value, instead of the similarity.

The combination unit 265 generates the composite image by superimposing the information related to the decoded information on the position having the predetermined positional relationship with the region on the latest image received from the camera 24, which corresponds to the series of regions determined to photograph the reflecting object 5 (operation S107). Then, the combination unit 265 causes the composite image to be displayed on the display device of the user interface 25 (operation S108). Then, the processor 26 ends the reception process.

As described above, the reception apparatus of the communication system compares the color or luminance of the series of regions over the plurality of images where the transmitted information has been decoded, with that of other series of regions or a threshold value. Thus, the reception apparatus may discriminate which of the illumination light source of the transmission apparatus and the reflecting object is photographed in the series of regions where the transmitted information has been decoded.

In addition, according to a modification, the camera 24 of the reception apparatus 2 may be, for example, a wide-angle camera, an omnidirectional camera, or a full-spherical camera. In addition, plural reflecting objects may be present within a range that can be photographed by the camera 24 at one time. In addition, an illumination light source may be provided for each of the plural reflecting objects to emit light on which identification information of the reflecting object is superimposed.

In this case, the processor 26 of the reception apparatus 2 may perform the process described above on the plurality of images obtained by the camera 24 and arranged in time series, so as to specify the region where each reflecting object is photographed. At this time, the processor 26 may perform the process of the discrimination unit 264 for each of two sets of the series of regions where the same identification number has been decoded, so as to determine in which of the sets of the series of regions the reflecting object 5 (or the illumination light source 13) is photographed. In addition, when there exists one set of the series of regions where the same identification number has been decoded, the processor 26 may perform the process of the discrimination unit 264 on the series of regions, so as to discriminate which of the reflecting object 5 and the illumination light source 13 is photographed in the series of regions.

In addition, each time an image is obtained after the identification number is decoded, the processor 26 may perform the process of the combination unit 265 on the obtained image. Then, for each reflecting object, the processor 26 may generate the composite image by superimposing the information related to the reflecting object on the position having a predetermined positional relationship with the region where the reflecting object is photographed.

Figure 10:
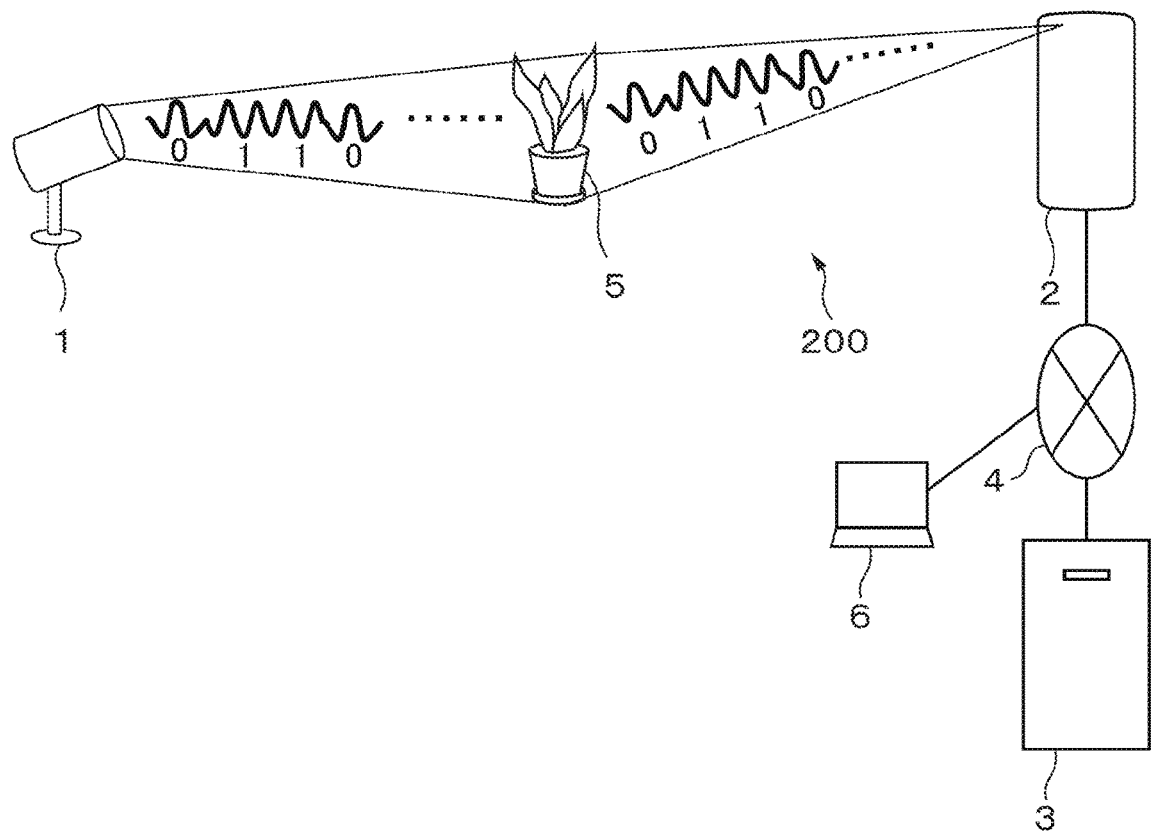
FIG. 10 is a schematic configuration diagram of a moving image distribution system according to a modification.

This modification may also be applied to a moving image distribution system. FIG. 10 is a schematic configuration view of the moving image distribution system according to the modification. A moving image distribution system 100 illustrated in FIG. 10 is different from the communication system 100 illustrated in FIG. 1 in that the moving image distribution system 100 further includes a client terminal 6 capable of communicating with the reception apparatus 2 via the communication network 4.

In this modification, the reception apparatus 2 operates as, for example, a distribution server. In this case, a plurality of images arranged in an order of being captured by the camera 24, that is, in an order of being played form moving image contents. Each time an image is obtained from the camera 24 after the identification information of each reflecting object is decoded, the processor 26 of the reception apparatus 2 (distribution server) performs a setting for each reflecting object such that the position on the image where the information related to the reflecting object is to be displayed has a predetermined positional relationship with the region where the reflecting object is photographed. Then, the processor 26 distributes the related information of each reflecting object and the position where the related information is to be displayed, in each image, along with the each image included in the moving image contents, to the client terminal 6. When a viewer plays the moving image contents with the client terminal 6, a processor (not illustrated) of the client terminal 6 specifies the reflecting object closest to the center of a display region displayed in a display device (not illustrated) of the client terminal 6 among the entire images. Then, the processor of the client terminal 6 may generate a composite image by superimposing the related information of the specified reflecting object on the set position on the image, and cause the composite image to be displayed in the display device of the client terminal 6.

Figure 11:
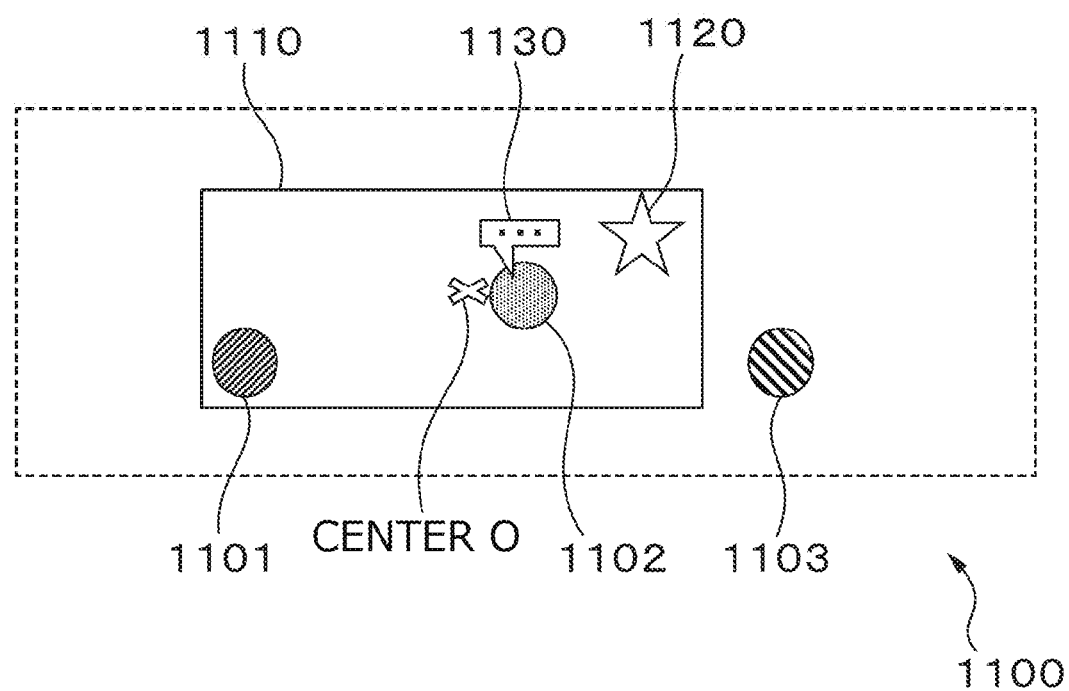
FIG. 11 is a view illustrating an example of a relationship between an image obtained by a camera and a region displayed on a display screen of a display device of a client terminal, according to the modification illustrated in FIG. 10.

FIG. 11 is a view illustrating an example of a relationship between the image obtained by the camera 24 and the region displayed on the display screen of the display device of the client terminal 6, according to the modification. In this example, three reflecting objects 1101 to 1103 are photographed in an image 1100. In the image 1100, a region 1110 is the region displayed on the display screen of the client terminal 6. In this case, among the reflecting objects 1101 to 1103, the reflecting object 1102 is closest to the center "0." Thus, related information 1130 of the reflecting object 1102 is displayed. Further, even when an illumination light source 1120 illuminating the reflecting object 1102 is photographed in the image 1100, the region where the reflecting object 1102 is photographed is specified as described above. Thus, the related information 1130 of the reflecting object 1102 is displayed in association with the reflecting object 1102, rather than the illumination light source 1120.

In addition, the viewer may operate the client terminal 6 to attach comments to the image displayed on the display screen of the client terminal 6 or edit the tag. In this case, the attached comments or edited tag may be saved in a memory (not illustrated) of the client terminal 6 in association with the identification information of the reflecting object of which the related information is displayed.

In the embodiment or modification described above, the server 3 may execute the process of each unit of the processor 26 of the reception apparatus 2. In this case, each time the camera 24 generates an image, the reception apparatus 2 may transmit the image to the server 3 via the communication interface 21 and the communication network 4. Then, a processor (not illustrated) of the server 3 performs the process of each unit of the processor 26 of the reception apparatus 2 according to the embodiment or modification described above, so as to discriminate which of the reflecting object 5 and the illumination light source 13 of the transmission apparatus 1 is photographed in the image. In this case, the server 3 may operate as a distribution server.

In addition, the communication system 100 according to the embodiment described above may be used for a position detection system for detecting the position of the reception apparatus 2. In this case, for example, the transmission apparatus 1 includes a plurality of illumination light sources 13, and the illumination light sources 13 are arranged at different positions on the ceiling of the room where the communication system 100 is provided. Then, for each illumination light source 13, the transmission apparatus 1 superimposes different identification information on the light emitted from the illumination light source 13.

The camera 24 of the reception apparatus 2 is, for example, a fisheye camera and is provided to face the ceiling of the room where the communication system 100 is provided. Then, the camera 24 generates an image where two or more of the plurality of illumination light sources 13 are photographed, at a predetermined shooting rate.

The processor 26 of the reception apparatus 2 may perform the process described above on a plurality of consecutive images in time which are obtained by the camera 24, so as to specify the region where each illumination light source 13 is photographed in each image. At this time, the processor 26 may perform the process of the discrimination unit 264 on each of the two sets of the series of regions where the same identification number has been decoded, so as to determine in which of the two sets of the series of regions the illumination light source is photographed. In addition, when there exists one set of the series of regions where the same identification number has been decoded, the processor 26 may perform the process of the discrimination unit 264 on the series of regions, so as to discriminate which of the reflecting object and the illumination light source is photographed in the series of regions. Accordingly, for example, even when the light emitted from any illumination light source 13 is reflected on, for example, the wall so that the reflected image of the illumination light source 13 is captured by the camera 24, the reception apparatus 2 may accurately specify the region where each illumination light source 13 is photographed in the image. Further, the processor 26 of the reception apparatus 2 may detect the position of the reception apparatus 2 by applying, for example, a nonlinear least squares method based on the center position of each of at least two illumination light sources 13 on the image. As for the process of detecting the position of the reception apparatus 2 from the center position of each of at least two illumination light sources on the image, the details of the process are disclosed in, for example, "An Indoor Positioning Method using Visible Light Communication and a High-definition Fish-eye Camera," Mizuguchi, et. al., the 2010 Institute of Electronics, Information and Communication Engineers general conference, communication conference paper collection 2, page 633.

In addition, the computer program for implementing each function of the processor of the reception apparatus according to each embodiment described above may be provided in a form of being stored in a computer readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable non-transitory recording medium storing program that causes a computer to execute a procedure, the procedure comprising:
    obtaining a first image that represents a photographing range that includes at least a part of a range irradiated by light emitted from a light source, information to be transmitted being superimposed on the light;
    specifying a first region where the information is decoded, on the first image;
    first discriminating which of the light source and a first object that reflects the light emitted from the light source is photographed in the first region, based on a similarity between a color of the first region and a color of the light emitted from the light source; and
    when the first object is photographed in the first region, generating a first composite image by superimposing information related to the first object on a position that has a predetermined positional relationship with the first region on the first image and displaying the first composite image.

2. The computer-readable non-transitory recording medium according to claim 1, wherein the first discriminating includes:
    when two first regions exist on the first image, calculating the similarity for each of the two first regions, and
    second discriminating that the light source is photographed in the first region that has higher similarity from the two first regions.

3. The computer-readable non-transitory recording medium according to claim 1, wherein the first discriminating includes:
    when one first region exists on the first image, third discriminating that the light source is photographed in the first region in a case where the similarity is higher than a predetermined value.

4. The computer-readable non-transitory recording medium according to claim 1, wherein the first discriminating includes:
    when two first regions exist on the first image, calculating a sum of the similarity for each of the two first regions and a luminance for the corresponding region, and
    fourth discriminating that the light source is photographed in the first region that has larger sum from the two first regions.

5. The computer-readable non-transitory recording medium according to claim 1, wherein the first discriminating includes:
    when one first region exists on the first image, calculating a sum of the similarity and the luminance of the first region, and
    fifth discriminating that the light source is photographed in the first region in a case where the sum is higher than a predetermined value.

6. The computer-readable non-transitory recording medium according to claim 1, wherein the first discriminating includes:
    obtaining a vector that represents an amplitude or intensity of each color component included in color of the first region, and
    calculating a cosine similarity between the vector and a reference vector that represents an amplitude or intensity of each color component included in color of the light emitted from the light source, as the similarity.

7. The computer-readable non-transitory recording medium according to claim 1, the procedure further comprising:
transmitting the decoded information to another apparatus via a communication interface; and
receiving information for representing the color of the light emitted from the light source in response to the decoded information, from the another apparatus via the communication interface.

8. The computer-readable non-transitory recording medium according to claim 1, the procedure further comprising:
when the first object is photographed in the first region on the first image, specifying a second region where a same object as the first object is photographed in a second image obtained after the first image that includes the first region where the information to be transmitted is decoded, by performing a tracking process between the first image and the second image; and
generating a second composite image by superimposing information related to the first object on a position that has a predetermined positional relationship with the second region on the second image and displaying the second composite image.

9. The computer-readable non-transitory recording medium according to claim 1, the procedure further comprising:
specifying a second region where second information superimposed on light emitted from a second light source is decoded, on the first image;
discriminating which of the second light source and a second object that reflects the light from the second light source is photographed in the second region, based on a similarity between a color of the second region and a color of the light emitted from the second light source;
when the first object is photographed in the first region and the second object is photographed in the second region, on the first image, specifying a third region where a same object as the first object is photographed and a fourth region where a same object as the second object is photographed in a second image obtained after the first image, by performing a tracking process between the first image and the second image; and
when the third and fourth regions are included in a display region on the second image displayed, generating a second composite image by superimposing information related to one of the first object and the second object which is photographed in the corresponding region, on a position that has a predetermined positional relationship with one of the third and fourth regions which is relatively close to a center of the display region and displaying the second composite image.

10. A communication system comprising:
a transmission apparatus that includes:
a light source configured to emit light,
a first memory, and
a first processor coupled to the first memory and the first processor configured to control the light source to superimpose information to be transmitted on light emitted from the light source; and
a reception apparatus that includes:
a second memory, and
a second processor coupled to the second memory and the second processor configured to:
obtain an image to represent a photographing range that includes at least a part of a range irradiated by light emitted from the light source, the information to be transmitted being superimposed on the light,
specify a region where the information is decoded, on the image,
discriminate which of the light source and an object that reflects the light is photographed in the region, based on a similarity between a color of the region and a color of the light emitted from the light source, and
when the object is photographed in the region, generate a composite image by superimposing information related to the object on a position that has a predetermined positional relationship with the region on the image and display the composite image.

11. A discrimination method comprising:
obtaining an image that represents a photographing range that includes at least a part of a range irradiated by light emitted from the light source, on which information to be transmitted is superimposed;
specifying a region where the information is decoded, on the image;
discriminating which of the light source and an object that reflects the light is photographed in the region, based on a similarity between a color of the region and a color of the light emitted from the light source; and
when the object is photographed in the region, generating a composite image by superimposing information related to the object on a position that has a predetermined positional relationship with the region on the image and displaying the composite image, by a processor.

* * * * *